United States Patent
Hu et al.

(10) Patent No.: US 9,310,644 B2
(45) Date of Patent: Apr. 12, 2016

(54) LIQUID CRYSTAL DISPLAY, LED BACKLIGHT SOURCE, AND THE DRIVING METHOD THEREOF

(71) Applicant: Shenzhen China Star Optoelectronics Technology Co., Ltd., Shenzhen, Guangdong (CN)

(72) Inventors: Anle Hu, Shenzhen (CN); Xianming Zhang, Shenzhen (CN); Hua Zhang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 271 days.

(21) Appl. No.: 13/877,167

(22) PCT Filed: Mar. 13, 2013

(86) PCT No.: PCT/CN2013/072547
§ 371 (c)(1),
(2) Date: Mar. 31, 2013

(87) PCT Pub. No.: WO2014/139106
PCT Pub. Date: Sep. 18, 2014

(65) Prior Publication Data
US 2014/0253846 A1    Sep. 11, 2014

(30) Foreign Application Priority Data

Mar. 11, 2013  (CN) .......................... 2013 1 0076701

(51) Int. Cl.
*H05B 37/02*      (2006.01)
*G02F 1/1335*     (2006.01)
*H05B 33/08*      (2006.01)

(52) U.S. Cl.
CPC ...... *G02F 1/133603* (2013.01); *H05B 33/0812* (2013.01); *H05B 33/0815* (2013.01); *G02F 2001/133612* (2013.01)

(58) Field of Classification Search
USPC .......................... 315/291, 307, 246, 312, 224
See application file for complete search history.

(56) References Cited

U.S. PATENT DOCUMENTS

| | | | |
|---|---|---|---|
| 7,855,520 B2 * | 12/2010 | Leng .............................. | 315/307 |
| 8,405,325 B2 * | 3/2013 | Inoko et al. .................... | 315/360 |
| 2011/0062872 A1 * | 3/2011 | Jin et al. ........................ | 315/122 |
| 2011/0109245 A1 * | 5/2011 | Lin et al. ....................... | 315/294 |
| 2011/0285289 A1 * | 11/2011 | Tremblay et al. ............... | 315/35 |

FOREIGN PATENT DOCUMENTS

| | | |
|---|---|---|
| CN | 1953029 A | 4/2007 |
| CN | 101409036 A | 4/2009 |
| CN | 102318002 A | 1/2012 |
| CN | 202615079 U | 12/2012 |
| CN | 102186276 A | 9/2013 |

* cited by examiner

*Primary Examiner* — Minh D A
(74) *Attorney, Agent, or Firm* — Andrew C. Cheng

(57) ABSTRACT

A liquid crystal display, a LED backlight source and the driving method thereof are disclosed. The LED backlight source includes a DC voltage input for inputting DC voltage, a boost circuit for increasing the voltage of the DC input and outputting the boosted DC voltage, a LED strip and a constant current driving circuit. The LED strip includes a plurality of serially connected LEDs and a first resistor (R1). The power consumption of the first MOS is reduced when the LEDs are driven. As such, the power consumption of the constant current driving circuit is reduced, so does the temperature. In this way, the energy conversion efficiency of the driving circuit of the LED backlight source is enhanced, and components within the constant current driving circuit are prevented from being burned out.

10 Claims, 2 Drawing Sheets

LIQUID CRYSTAL DISPLAY, LED BACKLIGHT SOURCE, AND THE DRIVING METHOD THEREOF

BACKGROUND OF THE INVENTION

1. Field of the Invention

Embodiments of the present disclosure relate to liquid crystal display technology, and more particularly to a liquid crystal display, a backlight module and a LED backlight source.

2. Discussion of the Related Art

With the technology development, the backlight technology has been continuously evolved. Generally, CCFL are major backlight sources for conventional liquid crystal displays. As the CCFL backlight sources have several drawbacks, such as low color restoration, low lighting efficiency, and high discharge voltage, bad discharge characteristic at low temperature and it takes long heating time to achieve stable gray scale. Thus, LED is another kind of technology that may be adopted as backlight sources.

For driving circuits in current LED backlight sources, the power consumption in an MOS transistor results in the resistance of the MOS transistor when the LED is driven. As such, the power consumption and the temperature of a constant current driving circuit are increased, and energy conversion efficiency of the driving circuit is reduced. In addition, the power consumption of the MOS transistor increases along with the current of the LED so that the power consumption of the constant current driving circuit is increased and components within the constant current driving circuit may be easily burned out.

SUMMARY

In view of the above, the power consumption of the first MOS is reduced when the LEDs are driven. As such, the power consumption of the constant current driving circuit is reduced, so does the temperature. In this way, the energy conversion efficiency of the driving circuit of the LED backlight source is enhanced, and components within the constant current driving circuit are prevented from being burned out.

DETAILED DESCRIPTION OF THE EMBODIMENTS

Embodiments of the invention will now be described more fully hereinafter with reference to the accompanying drawings, in which embodiments of the invention are shown.

Figure 1:
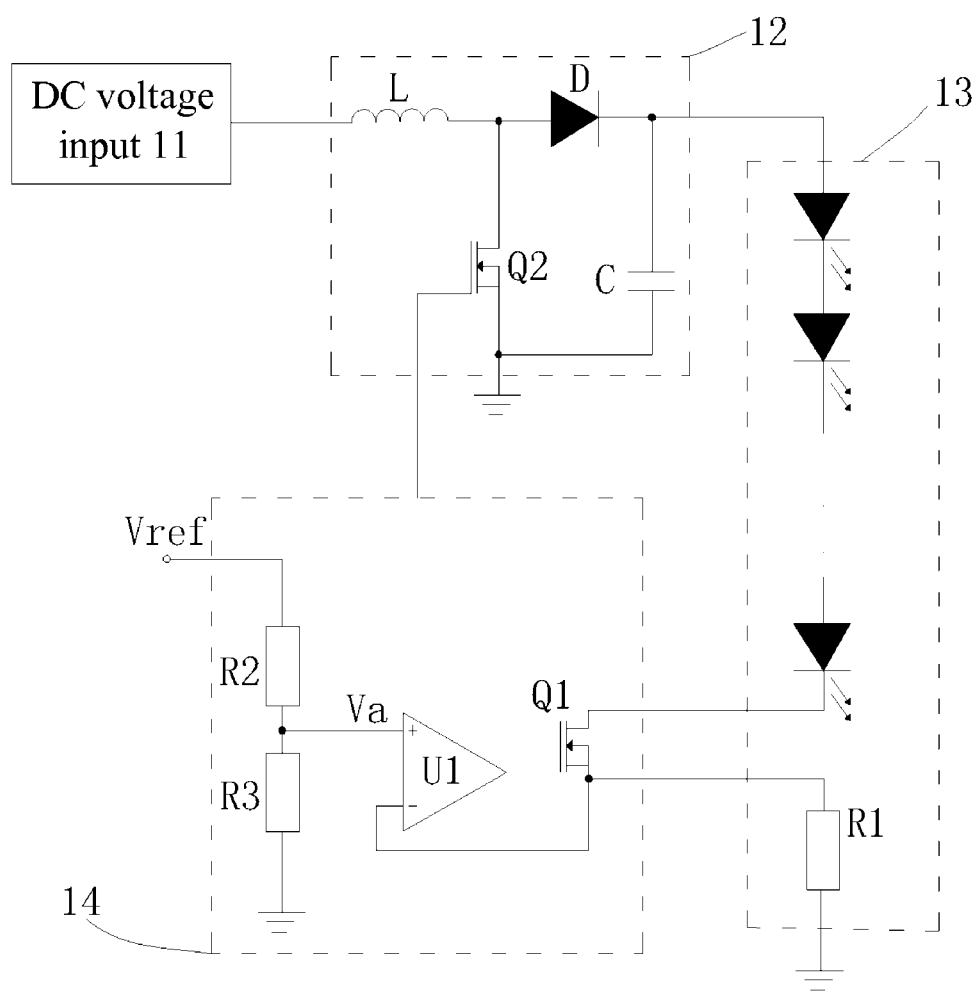
FIG. 1 is a schematic view of the LED backlight source for a liquid crystal display in accordance with one embodiment.

FIG. 1 is a schematic view of the LED backlight source for a liquid crystal display in accordance with one embodiment. As shown, the LED backlight source includes a direct current (DC) input 11, a boost circuit 12, a LED strip 13 and a constant current driving circuit 14. The DC input 11 is for inputting the DC voltage, such as 24V. The DC voltage may be transformed from alternating current (AC), such as 110V or 220V, by a conventional DC/AC converter.

The boost circuit 12 increases the voltage of the DC input by the DC input 11 and then output the boosted DC voltage.

The LED strip 13 is arranged behind the liquid crystal panel so as to operate as the backlight source. The LED strip 13 includes a plurality of LEDs and a first resistor (R1). The LED strip 13 receives the boosted DC voltage from the boost circuit 12. The number of the LEDs of the LED strip 13 ("N") is defined by Equation 1 below, in which N is an integer greater than zero:

$$N \times Vd \leq Vs;$$

Wherein the Vd indicates the lighting voltage of each LED, and Vs indicates the boosted DC voltage output by the boost circuit 12.

For example, when Vd equals to 5.5V and Vs equals to 60V, N is smaller than or equal to 10.

The constant current driving circuit 14 is for adjusting the voltage at two ends of the first resistor (R1) so as to control the current of the LED strip 13. At the same time, the constant current driving circuit 14 outputs a level signal to the boost circuit 12. The level signal is the driving signal for driving the boost circuit 12 to supply the boosted DC voltage to the LED strip 13.

In one embodiment, the boost circuit 12 includes an inductor (L), a second metal oxide silicon (MOS) transistor (Q2), a rectifier diode (D) and a capacitor (C).

One end of the inductor (L) connects to the DC input 11, and the other end of the inductor (L) connects to a positive end of the rectifier diode (D). The drain of the second MOS (Q2) connects between the inductor (L) and the positive end of the rectifier diode (D). One end of the capacitor (C) connects to a negative end of the rectifier diode (D) and to the positive end of the LED strip 13. The other end of the capacitor (C) connects to the source of the second MOS (Q2). The gate of the second MOS (Q2) connects to the constant current driving circuit 14.

The level signal output by the constant current driving circuit 14 drives the boost circuit 12 to supply the boosted DC voltage to the LED strip 13 by controlling the gate of the second MOS (Q2).

In one embodiment, the constant current driving circuit 14 includes a second resistor (R2), a third resistor (R3), an operational amplifier (U), and a first MOS (Q1). One end of the second resistor (R2) receives a reference voltage (Vref). The other end of the second resistor (R2) connects to the third resistor (R3). The positive end of the operational amplifier (U) connects between the second resistor (R2) and the third resistor (R3). The output end of the operational amplifier (U) connects to the gate of the first MOS (Q1). The negative end of the operational amplifier (U) connects to the source of the first MOS (Q1). The drain of the first MOS (Q1) connects to the negative end of the LED strip 13. The source of the first MOS (Q1) connects to the first resistor (R1).

It is to be noted that the constant current driving circuit 14 may be an integrated circuit (IC) including a plurality of pins, and one pin connects to the gate of the second MOS (Q2).

After the constant current driving circuit 14 is turn on, the reference voltage (Vref), such as 5V, is divided by the third resistor (R3) to obtain an input voltage (Va). That is, the input voltage (Va) is calculated by Equation 2:

$$Va = \frac{R3}{R2 + R3} \times Vref;$$

The calculated Va is inputted to the positive end of the operational amplifier (U). As the negative end of the operational amplifier (U) connects to the source of the first MOS (Q1), the voltage of the positive end of the operational amplifier (U) equals to that of the negative end. Thus, the voltage of the two ends of the first resistor (R1) equal to Va. The current of the LED strip 13 ("$I_{LED}$") may be obtained by Equation 3 below:

$$I_{LED}=Va/R1;$$

As the resistance of the first MOS (Q1) equals to a certain value, the voltage of the drain of the first MOS (Q1) ("Vm") may be obtained by Equation 4 below:

$$Vm=I_{LED}\times(R1+R_{Q1});$$

Wherein $R_{Q1}$ indicates the resistance of the first MOS (Q1). The power consumption of the first MOS (Q1) ("$P_{Q1}$") satisfies Equation 5 below:

$$P_{Q1}=Vm\times I_{LED}=I_{LED}^2\times(R1+R_{Q1});$$

It can be understood that ($I_{LED}$) and $P_{Q1}$ are directly related.

In one embodiment, the input voltage (Va) may be controlled by adjusting the value of the reference voltage (Vref). In this way, the current of the LED strip 13 ($I_{LED}$) is adjusted. For example, by decreasing the reference voltage (Vref), the input voltage (Va) and the current of the LED strip 13 ($I_{LED}$) are also decreased. In view of Equation 5, the $P_{Q1}$ is decreased at the same time.

In addition, the input voltage (Va) may be adjusted by changing the ratio of the resistance of the second resistor (R2) and the third resistor (R3) so as to adjust the current of the LED string 13 ($I_{LED}$). For example, the input voltage (Va) may be decreased by reducing the resistance of the third resistor (R3) and by increasing that of the second resistor (R2). It can be understood from Equation 5 that the power consumption $P_{Q1}$ is decreased.

Given the brightness of the LED string 13 stays the same, the current of the LED string 13 ($I_{LED}$) may be decreased by adding the number of the LEDs.

Figure 2:
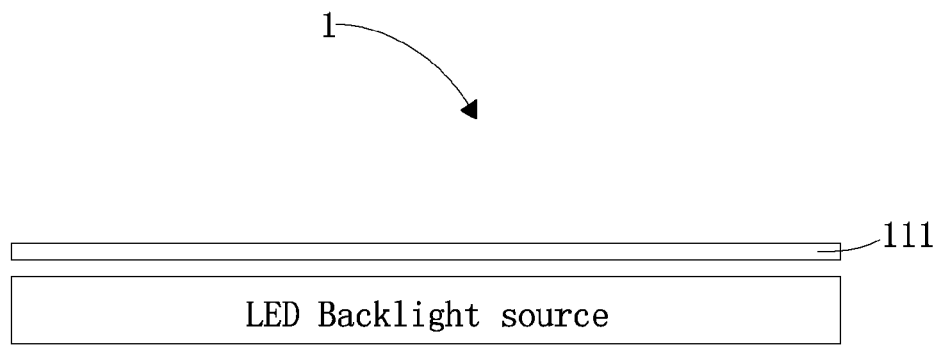
FIG. 2 is the liquid crystal display having the LED backlight source in accordance with one embodiment.

FIG. 2 is the liquid crystal display having the LED backlight source in accordance with one embodiment.

As shown, the liquid crystal display 1 includes a display panel 111 and a LED backlight source. The display panel 111 is arranged to be opposite to the LED backlight source. The LED backlight source supplies lights to the display panel 111 so that the display panel 111 can display images.

Figure 3:
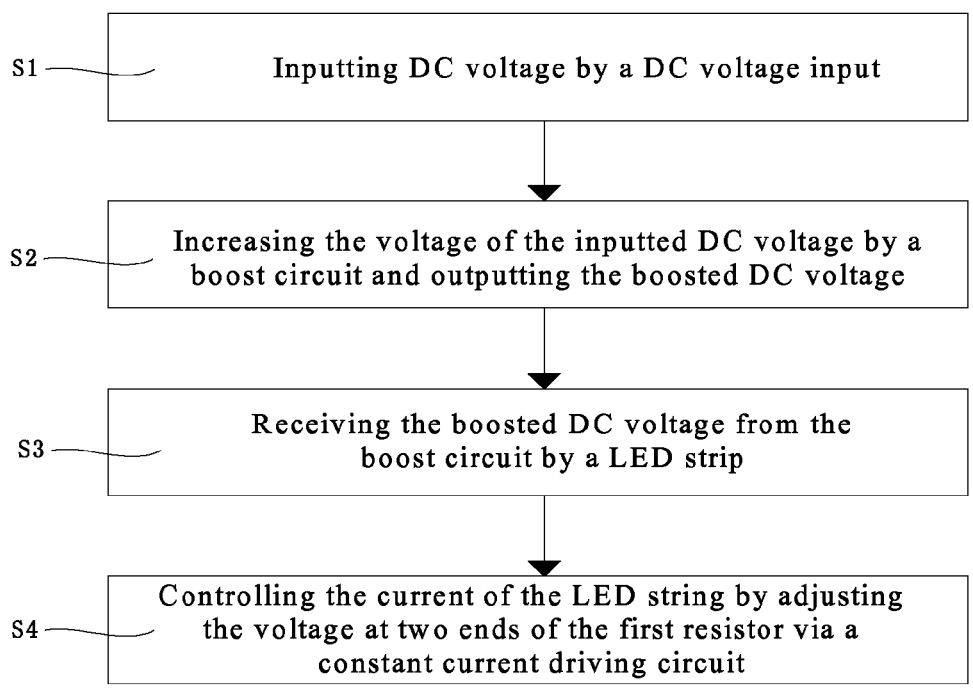
FIG. 3 is a flowchart showing the driving method of the LED backlight source in accordance with one embodiment.

FIG. 3 is a flowchart showing the driving method of the LED backlight source in accordance with one embodiment. The driving method includes the following steps. In step S1, the DC voltage is inputted by a DC voltage input. In step S2, The voltage of the inputted DC voltage is increased by the boost circuit and then the boosted DC voltage is outputted. In step S3, the LED strip receives the boosted DC voltage from the boost circuit. In step S4, the voltage at two ends of the first resistor (R1) is adjusted by the constant current driving circuit so that the current of the LED string is controlled.

In view of the above, the power consumption of the first MOS is reduced when the LEDs are driven. As such, the power consumption of the constant current driving circuit is reduced, so does the temperature. In this way, the energy conversion efficiency of the driving circuit of the LED backlight source is enhanced, and components within the constant current driving circuit are prevented from being burned out.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A driving method for a LED backlight source, comprising:
   (a) inputting a DC voltage by a DC voltage input;
   (b) increasing the voltage of the inputted DC voltage by a boost circuit and outputting the boosted DC voltage;
   (c) receiving the boosted DC voltage from the boost circuit by a LED strip; and
   (d) controlling the current of the LED string by adjusting the voltage at two ends of the first resistor (R1), outputting a level signal to the boost circuit by a constant current driving circuit, and decreasing the voltage at two ends of the first resistor (R1) by reducing a reference voltage received by the constant current driving circuit so that the current of the LED strip is decreased, wherein the boost circuit comprises an inductor (L), a second metal oxide silicon (MOS) transistor Q2, a rectifier diode (D) and a capacitor (C), wherein one end of the inductor (L) connects to the DC input, and the other end of the inductor (L) connects to a positive end of the rectifier diode (D), the drain of the second MOS (Q2) connects between the inductor (L) and the positive end of the rectifier diode (D), one end of the capacitor (C) connects to a negative end of the rectifier diode (D) and to the positive end of the LED strip, the other end of the capacitor (C) connects to the source of the second MOS (Q2), and the gate of the second MOS (Q2) connects to the constant current driving circuit.

2. The driving method as claimed in claim 1, wherein step (d) further comprises increasing the ratio of the resistance of the second resistor (R2) and the third resistor (R3) to reduce the voltage at two ends of the first resistor (R1) so that the current of the LED strip is decreased.

3. A LED backlight source for a liquid crystal display, comprising:
   a DC voltage input for inputting DC voltage;
   a boost circuit for increasing the voltage of the DC input and outputting the boosted DC voltage;
   a LED strip comprising a plurality of serially connected LEDs and a first resistor (R1), the LED strip receives the boosted DC voltage from the boost circuit, wherein the DC voltage of the LED strip is smaller than or equal to the boosted DC voltage output from the boost circuit;
   a constant current driving circuit for adjusting the voltage at two ends of the first resistor (R1) so as to control the current of the LED strip and for outputting a level signal to the boost circuit; and
   wherein the voltage at two ends of the first resistor is decreased by reducing the reference voltage of the constant driving circuit so that the current of the LED strip is wherein the boost circuit comprises an inductor (L), a second metal oxide silicon (MOS) transistor Q2, a rectifier diode (D) and a capacitor (C), wherein one end of the inductor (L) connects to the DC input, and the other end of the inductor (L) connects to a positive end of the rectifier diode (D), the drain of the second MOS (Q2) connects between the inductor (L) and the positive end of the rectifier diode (D), one end of the capacitor (C) connects to a negative end of the rectifier diode (D) and to the positive end of the LED strip, the other end of the capacitor (C) connects to the source of the second MOS (Q2), and the gate of the second MOS (Q2) connects to the constant current driving circuit.

4. The LED backlight source as claimed in claim 3, wherein the constant current driving circuit comprises a second resistor (R2), a third resistor (R3), an operational amplifier (U), and a first MOS (Q1), wherein one end of the second resistor (R2) receives a reference voltage (Vref), and the other end of the second resistor (R2) connects to the third resistor (R3), the positive end of the operational amplifier (U) connects between the second resistor (R2) and the third resistor (R3), the output end of the operational amplifier (U) connects to the gate of the first MOS (Q1), the negative end of the operational amplifier (U) connects to the source of the first MOS (Q1), the drain of the first MOS (Q1) connects to the negative end of the LED strip, and the source of the first MOS (Q1) connects to the first resistor (R1).

5. The LED backlight source as claimed in claim 3, wherein the ratio of the resistance of the second resistor (R2) and the third resistor (R3) is increased by reducing the voltage at two ends of the first resistor (R1) so that the current of the LED strip is decreased.

6. The LED backlight source as claimed in claim 3, wherein the DC voltage is transformed from alternating current from an external of the display.

7. A liquid crystal display, comprises a liquid crystal panel and a LED backlight source opposite to the liquid crystal panel, the LED backlight source supplies lights to the liquid crystal panel, the LED backlight source comprises:
a DC voltage input for inputting DC voltage;
a boost circuit for increasing the voltage of the DC input and outputting the boosted DC voltage;
a LED strip comprising a plurality of serially connected LEDs and a first resistor (R1), the LED strip receives the boosted DC voltage from the boost circuit, wherein the DC voltage of the LED strip is smaller than or equal to the boosted DC voltage output from the boost circuit;
a constant current driving circuit for adjusting the voltage at two ends of the first resistor (R1) so as to control the current of the LED strip and for outputting a level signal to the boost circuit; and
wherein the voltage at two ends of the first resistor is decreased by reducing the reference voltage of the constant current driving circuit so that the current of the LED strip is decreased, wherein the boost circuit comprises an inductor (L), a second metal oxide silicon (MOS) transistor Q2, a rectifier diode (D) and a capacitor (C), wherein one end of the inductor (L) connects to the DC input, and the other end of the inductor (L) connects to a positive end of the rectifier diode (D), the drain of the second MOS (Q2) connects between the inductor (L) and the positive end of the rectifier diode (D), one end of the capacitor (C) connects to a negative end of the rectifier diode (D) and to the positive end of the LED strip, the other end of the capacitor (C) connects to the source of the second MOS (Q2), and the gate of the second MOS (Q2) connects to the constant current driving circuit.

8. The liquid crystal display as claimed in claim 7, wherein the constant current driving circuit comprises a second resistor (R2), a third resistor (R3), an operational amplifier (U), and a first MOS (Q1), wherein one end of the second resistor (R2) receives a reference voltage (Vref), and the other end of the second resistor (R2) connects to the third resistor (R3), the positive end of the operational amplifier (U) connects between the second resistor (R2) and the third resistor (R3), the output end of the operational amplifier (U) connects to the gate of the first MOS (Q1), the negative end of the operational amplifier (U) connects to the source of the first MOS (Q1), the drain of the first MOS (Q1) connects to the negative end of the LED strip, and the source of the first MOS (Q1) connects to the first resistor (R1).

9. The liquid crystal display as claimed in claim 8, wherein the ratio of the resistance of the second resistor (R2) and the third resistor (R3) is increased by reducing the voltage at two ends of the first resistor (R1) so that the current of the LED strip is decreased.

10. The LED backlight source as claimed in claim 7, wherein the DC voltage is transformed from alternating current from an external of the display.

* * * * *